(12) United States Patent
Ohtoshi et al.

(10) Patent No.: US 8,223,277 B2
(45) Date of Patent: Jul. 17, 2012

(54) DISPLAY DEVICE AND DISPLAY METHOD

(75) Inventors: Tetsuya Ohtoshi, Kobe (JP); Minoru Maehata, Kobe (JP)

(73) Assignee: Fujitsu Ten Limited, Kobe (JP)

( * ) Notice: Subject to any disclaimer, the term of this patent is extended or adjusted under 35 U.S.C. 154(b) by 941 days.

(21) Appl. No.: 12/223,920

(22) PCT Filed: Feb. 21, 2007

(86) PCT No.: PCT/JP2007/053150
§ 371 (c)(1),
(2), (4) Date: Aug. 13, 2008

(87) PCT Pub. No.: WO2007/097353
PCT Pub. Date: Aug. 30, 2007

(65) Prior Publication Data
US 2009/0185083 A1 Jul. 23, 2009

(30) Foreign Application Priority Data

Feb. 22, 2006 (JP) .................................. 2006-046031
May 26, 2006 (JP) .................................. 2006-147466

(51) Int. Cl.
*H04N 5/64* (2006.01)
(52) U.S. Cl. ........................ 348/837; 348/113
(58) Field of Classification Search ........................ None
See application file for complete search history.

(56) References Cited

U.S. PATENT DOCUMENTS

| 6,046,849 | A | 4/2000 | Moseley et al. |
|---|---|---|---|
| 6,055,013 | A | 4/2000 | Woodgate et al. |
| 6,055,103 | A | 4/2000 | Woodgate et al. |
| 6,377,295 | B1 | 4/2002 | Woodgate et al. |
| 6,437,915 | B2 | 8/2002 | Moseley et al. |
| 6,624,863 | B1 | 9/2003 | Jacobs et al. |
| 2005/0169541 | A1* | 8/2005 | Nakakuki ..................... 382/232 |
| 2005/0248503 | A1* | 11/2005 | Schobben et al. ................. 345/7 |
| 2006/0279567 | A1 | 12/2006 | Schwerdtner et al. |
| 2009/0002268 | A1 | 1/2009 | Ueta et al. |

FOREIGN PATENT DOCUMENTS

| EP | 0 953 962 A2 | 11/1999 |
|---|---|---|
| GB | 2 405 546 A | 3/2005 |
| JP | A-06-186526 | 7/1994 |

(Continued)

OTHER PUBLICATIONS

Notification of the First Office Action for Chinese Patent Application No. 200780013708.9, dated Sep. 17, 2010 (w/ English translation).

(Continued)

*Primary Examiner* — Mehrdad Dastouri
*Assistant Examiner* — James Anderson, II
(74) *Attorney, Agent, or Firm* — Oliff & Berridge, PLC

(57) ABSTRACT

A display device displays a D-seat image and a P-seat image on a display screen in a time-sharing manner, and forms a non-display state by inserting a black image BL or the like when changing the viewing angle of the display screen by controlling a liquid crystal shutter provided on the display screen in synchronization with the switching between the D-seat image and the P-seat image. With this display device, it is possible to prevent the image in one field of view from entering the other field of view, even if there are differences in the switching timing of the liquid crystal shutter.

4 Claims, 12 Drawing Sheets

FOREIGN PATENT DOCUMENTS

| | | |
|---|---|---|
| JP | A-06-236152 | 8/1994 |
| JP | A-09-046622 | 2/1997 |
| JP | A-09-51552 | 2/1997 |
| JP | A-11-331876 | 11/1999 |
| JP | 2000036927 A * | 2/2000 |
| JP | A-2000-036927 | 2/2000 |
| JP | A-2000-137443 | 5/2000 |
| JP | A-2003-137005 | 5/2003 |
| JP | 2003259395 A * | 9/2003 |
| JP | A-2003-259395 | 9/2003 |
| JP | A-2004-206089 | 7/2004 |
| JP | A-2004-233816 | 8/2004 |
| JP | A-2005-071286 | 3/2005 |
| JP | A-2005-073076 | 3/2005 |
| JP | A-2005-107326 | 4/2005 |
| JP | A-2005-244574 | 9/2005 |
| JP | A-2005-284592 | 10/2005 |
| JP | A-2006-301573 | 11/2006 |
| WO | WO 2004/016460 A1 | 2/2004 |
| WO | WO 2005/027534 A2 | 3/2005 |
| WO | WO 2005027534 A2 * | 3/2005 |
| WO | WO 2006/059528 A1 | 6/2006 |

OTHER PUBLICATIONS

European Search Report issued on Oct. 8, 2009 in European Patent Application No. 07 71 4650.

Office Action for corresponding European Patent Application No. 07714650.4, mailed on Mar. 31, 2011.

Notice of Rejection dated Dec. 27, 2011 issued in Japanese Patent Application No. 2008501733 (with translation).

* cited by examiner

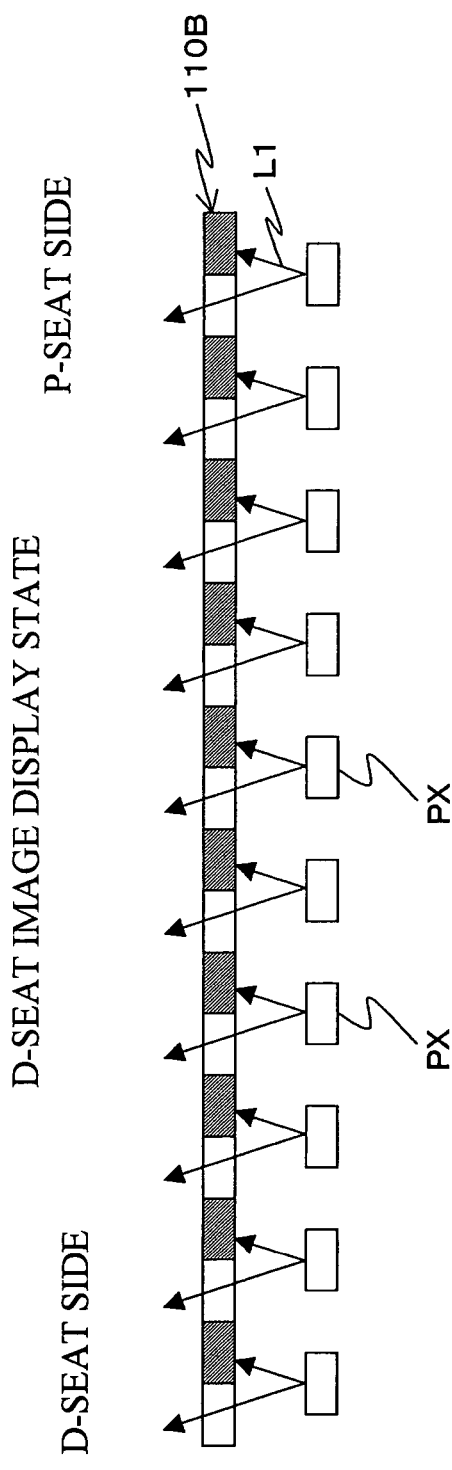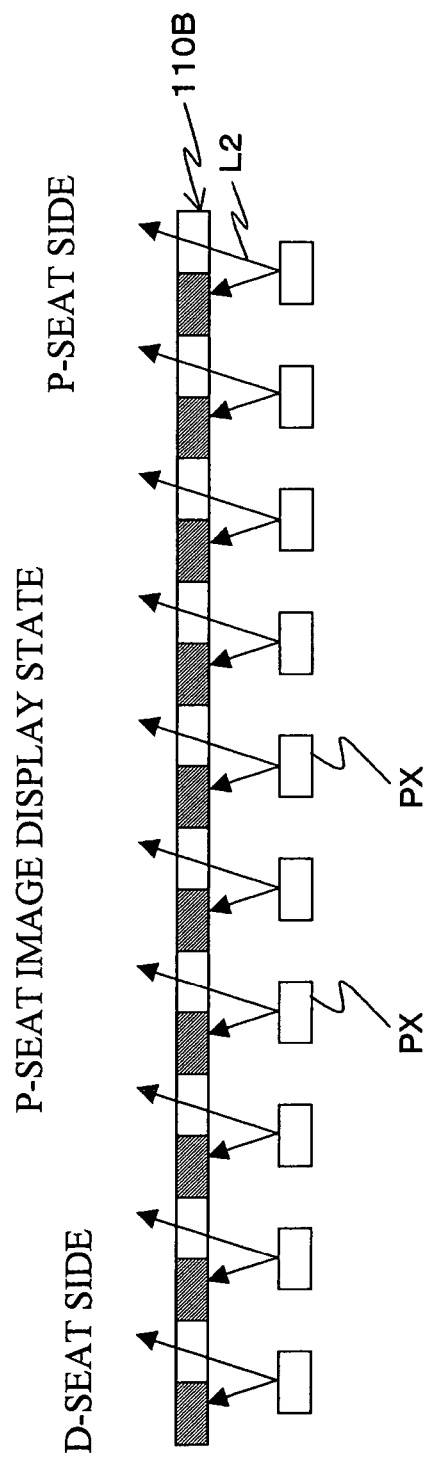
Fig. 6A
Fig. 6B

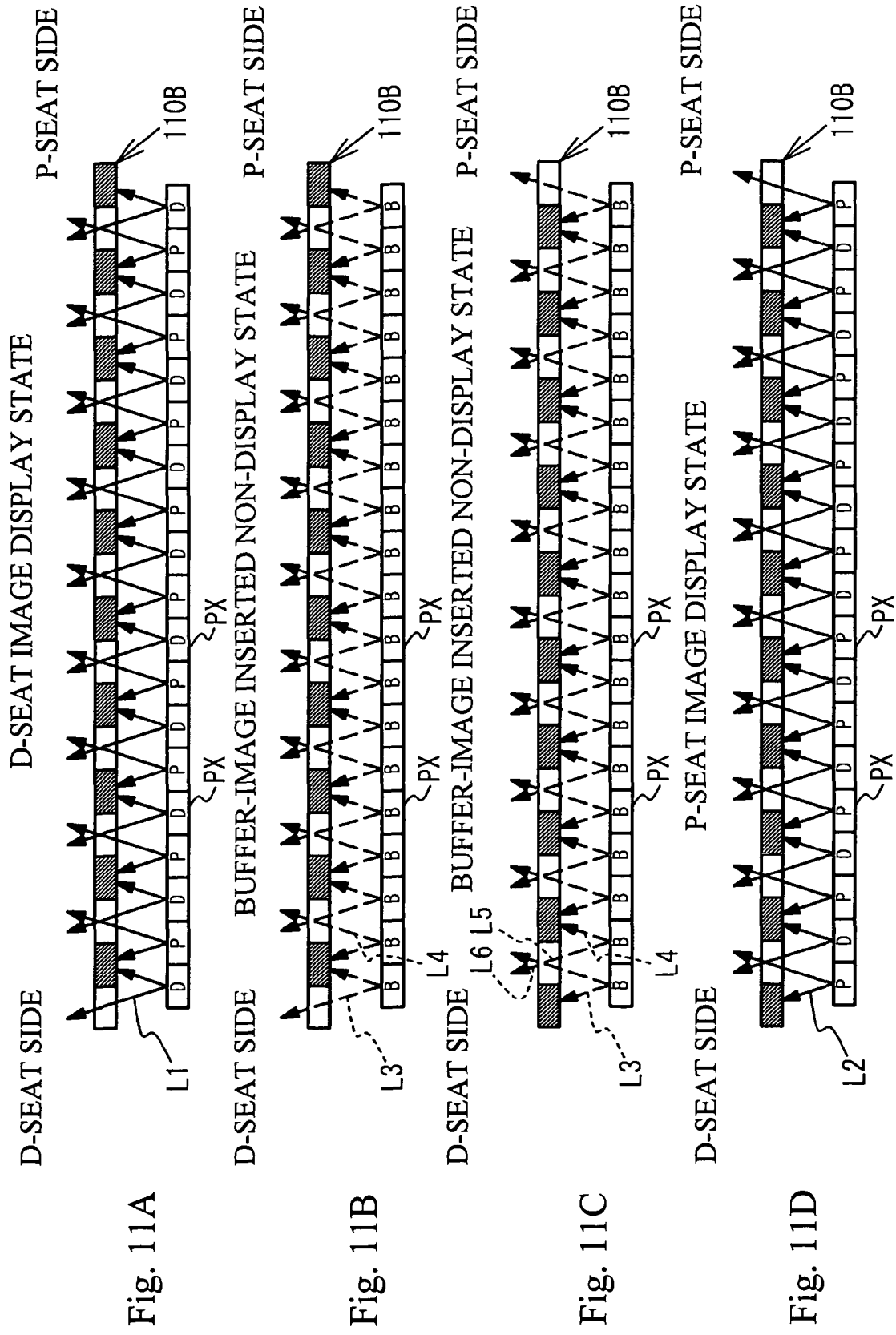

LIQUID CRYSTAL PANEL

TIMING 1

LIQUID CRYSTAL SHUTTER

OUT OF ALIGNMENT WITH
LIQUID CRYSTAL PANEL
BY HALF DOT

TIMING 2

OUT OF ALIGNMENT WITH
LIQUID CRYSTAL PANEL
BY HALF DOT

DISPLAY DEVICE AND DISPLAY METHOD

TECHNICAL FIELD

The present invention relates to a display device that can display images in different directions, and a display method.

BACKGROUND ART

Display devices for vehicles today can display various kinds of information received from television receivers, audio devices, DVD players, and the likes, as well as navigation information.

A known display device for vehicles outputs different display images directed to the driver's seat and the passenger's seat. For example, navigation information is displayed for the driver, while a television image, a DVD image, or the like is displayed for the passenger in the passenger's seat (see Patent Reference 1, for example).

[Patent Reference 1] Japanese Unexamined Patent Publication No. 2004-206089

DISCLOSURE OF THE INVENTION

Problems to be Solved by the Invention

However, the multiview display disclosed in Patent Reference 1 or the like has the problem that the resolution of the displayed image in each field of view is halved, because the display elements on the display are divided between the driver's seat side and the passenger's seat side when each image is displayed.

The multiview display disclosed in Patent Reference 1 or the like also has the problem that a displayed image enters the field of view of another displayed image.

The above problems exist not only in display devices for vehicles but also in display devices to be used in other objects. To solve those problems, there is a technique of using a liquid crystal shutter or the like as the active shutter (the variable shutter) and controlling each displayed image and the variable shutter in synchronization with each other. The technique of controlling each display image and the variable shutter in synchronization with each other may be used not only for multiview displays but also for other variable displays.

However, in the case where a display screen and a liquid crystal shutter are controlled in synchronization with each other, a problem is caused as an image to be shut off leaks into the other side due to control errors around the time when switching is performed on the display screen and the liquid crystal shutter.

It is therefore an object of the present invention to provide a display device and a display method that can solve the problem that an image to be shut off leaks into another image (due to differences in timing) when switching is performed between displayed images and between the states of the variable shutter (or screen display modes).

Means for Solving the Problems

The above object is achieved by a display device including: a shutter that is provided on a display screen, shields part of the display screen, and is capable of changing the shielded region; and a display control unit that displays a plurality of display contents on the display screen in a time-sharing manner, and changes image display modes by controlling the shutter in synchronization with the switching between the display contents, the display control unit inserting a buffer image when switching the image display modes.

With this structure, different display contents are displayed in a time-sharing manner. Accordingly, a decrease in resolution of each displayed image can be prevented. Also, by inserting a buffer image, the buffer image is displayed on the display screen during the switching, and a non-display state is formed. Thus, image leakage can be certainly prevented when there are differences in timings of performing the switching on the display screen and the shutter.

The above object may also be achieved by a display device including: a viewing-angle changing shutter that is provided on a display screen, and is capable of changing a viewing angle of the display screen; and a display control unit that displays a plurality of display contents on the display screen in a time-sharing manner, and controls the viewing-angle changing shutter in synchronization with the switching between the display contents so as to create displays at different viewing angles, the display control unit inserting a buffer image when switching the image display modes.

The display device may have a structure such that the display control unit generates a first composite image by combining a first designated pixel group in a first image and a second exclusive pixel group existing in a position exclusive of the first designated pixel group in a second image, generates a second composite image by combining a second designated pixel group existing in the same position as the first designated pixel group in the second image and a first exclusive pixel group existing in a position exclusive of the second designated pixel group in the first image, and displays the first and second composite images on the display screen in a time-sharing manner.

With this structure, the first and second composite images are displayed on the display screen in a time-sharing manner. Accordingly, a decrease in resolution can be prevented by virtue of an afterimage effect. Further, by inserting a buffer image at the time of switching the image display modes, one image can be prevented from leaking into the other image.

The above object may also be achieved by display method of switching image display modes by controlling a display image displayed on a display screen and a shuttered state of a partial region on the display screen in synchronization with each other, the method comprising the step of displaying a buffer image when switching the display modes.

The above object may also be achieved by a display method of displaying images at different viewing angles by displaying a plurality of display contents on a display screen in a time-sharing manner, and controlling a viewing angle changing shutter provided on the display screen in synchronization with the switching between the display contents, the method comprising the step of displaying a buffer image when switching the display modes.

The display method may further include the steps of: generating a first composite image by combining a first designated pixel group in a first image and a second exclusive pixel group existing in a position exclusive of the first designated pixel group in a second image; generating a second composite image by combining a second designated pixel group existing in the same position as the first designated pixel group in the second image and a first exclusive pixel group existing in a position exclusive of the second designated pixel group in the first image; and displaying the first and second composite images on the display screen in a time-sharing manner.

Effects of the Invention

In accordance with the present invention, it is possible to solve the problem that an image to be shut off leaks into another image (due to differences in timing) when switching is performed between displayed images and between the states of the variable shutter (or screen display modes).

BRIEF DESCRIPTION OF THE DRAWINGS

FIGS. 6A and 6B show the relationship between the displayed image and the liquid crystal shutter;

FIGS. 11A, 11B, 11C, and 11D illustrate the display technique to be used in a case where output patterns including a D-seat image IM1 and a P-seat image IM2 are formed on the same screen.

DESCRIPTION OF THE PREFERRED EMBODIMENTS

The following is a detailed description of preferred embodiments of the present invention, with reference to the accompanying drawings.

Figure 1:
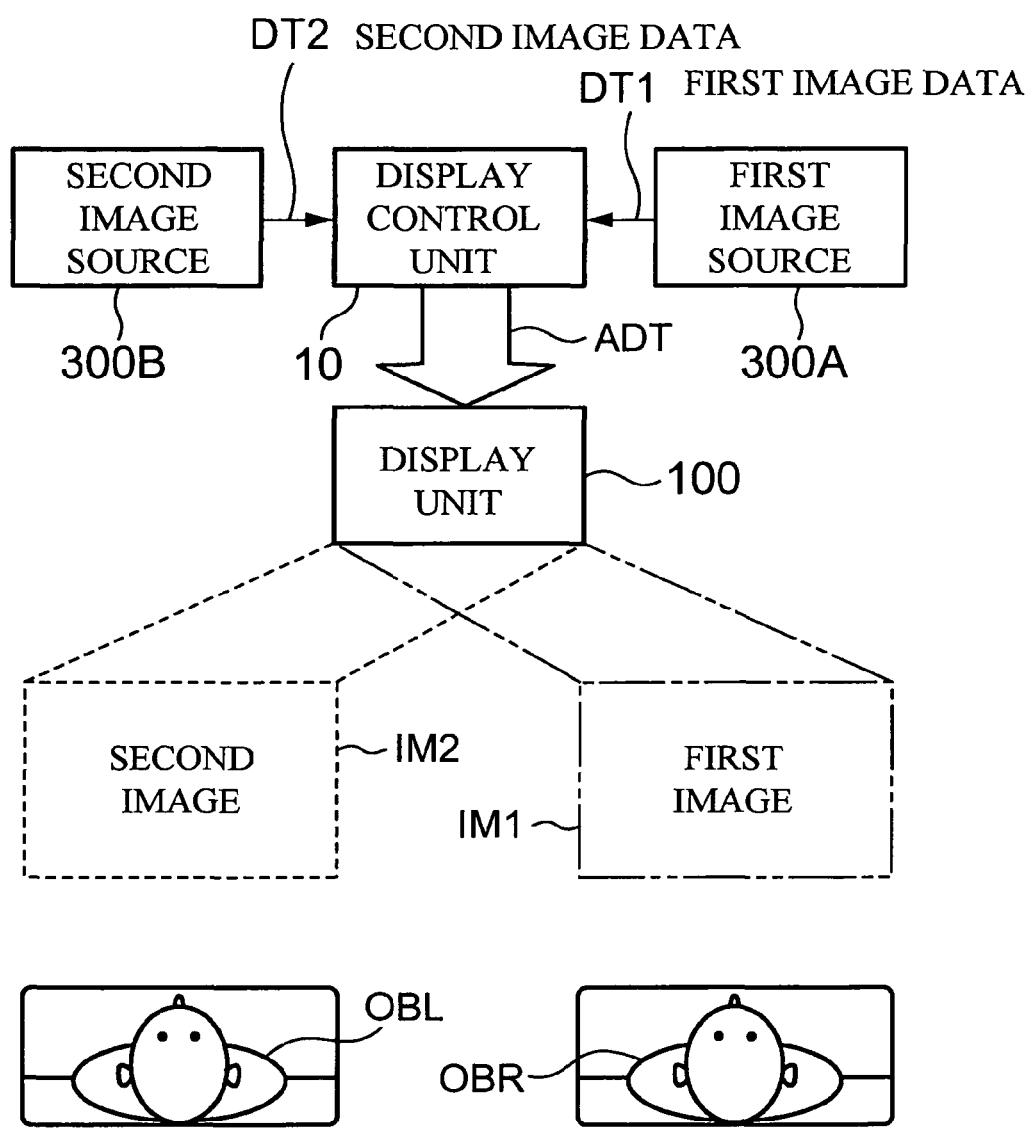
FIG. 1 illustrates the structure of a display device in accordance with an embodiment of the present invention.

FIG. 1 illustrates the structure of a display device in accordance with an embodiment of the present invention.

As shown in FIG. 1, this display device includes a display control unit 10 as a display controller and a display unit 100 that forms a display screen.

The display control unit 10 receives image data (an image signal) DT2 from a second image source 300B, as well as image data (an image signal) DT1 from a first image source 300A. The display control unit 10 then outputs image data (an image signal) ADT formed by combining the first and second image data DT1 and DT2 to the common display unit 100. The specific example of the display control unit 10 will be described later.

The first and second image sources 300A and 300B may be formed with the later described camera, TV reception unit, DVD reproduction unit, HD reproduction unit, navigation unit, and the likes.

The display unit 100 includes a liquid crystal panel, a backlight, and a liquid crystal shutter, as will be described later. The display unit 100 displays image data on the display screen in a time-sharing manner, and changes the viewing angle by controlling the liquid crystal shutter in conjunction with switching of sets of image data. By doing so, a first image IM1 based on the first image data DT1 can be viewed by an observer OBR looking from the right side, and a second image IM2 based on the second image data DT2 can be viewed by an observer L looking from the left side. A specific display control operation to be performed by the display control unit 10 will be described later.

Figure 2:
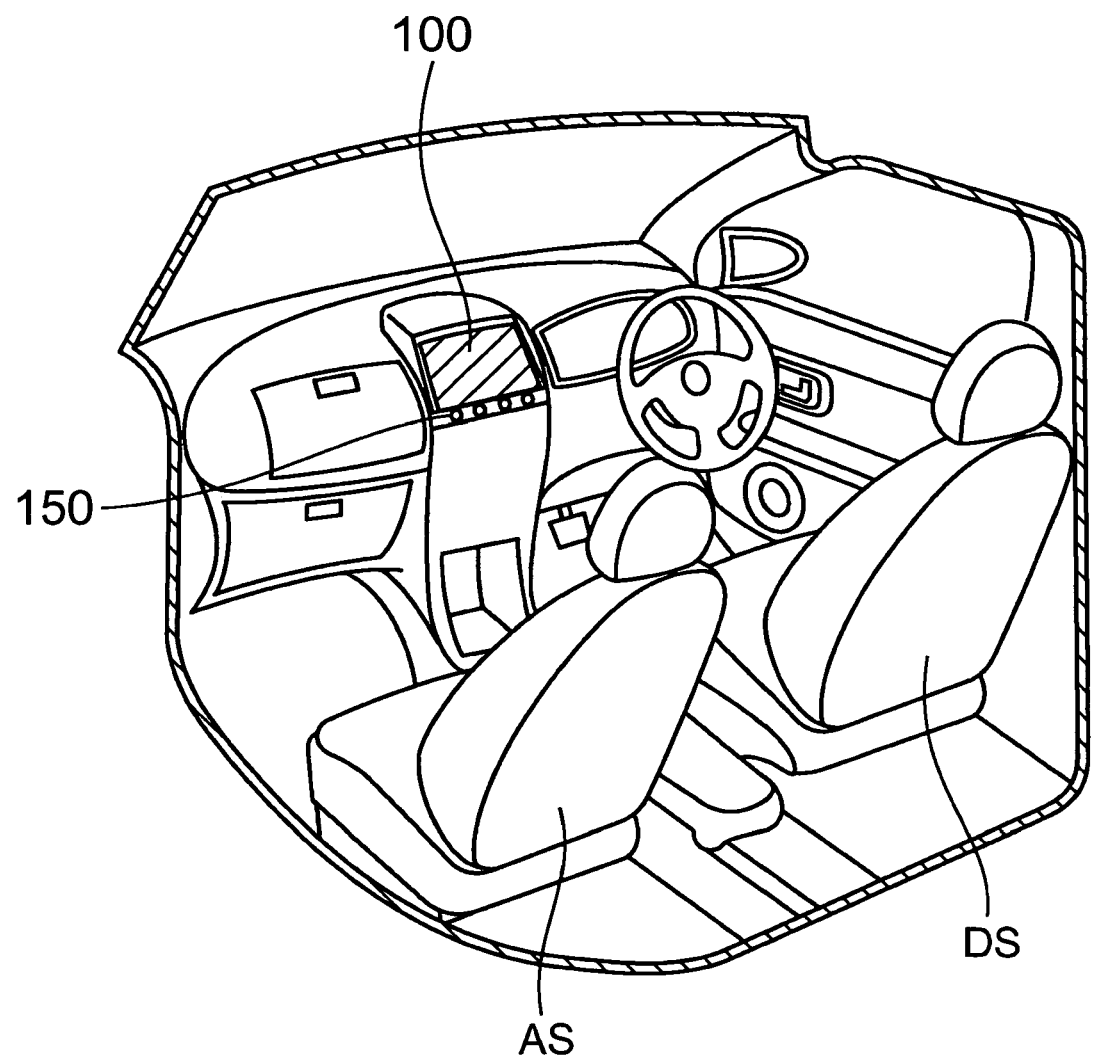
FIG. 2 is a perspective view illustrating an example case where the display device is mounted in a vehicle.

FIG. 2 is a perspective view illustrating the exterior of the display device in accordance with an embodiment of the present invention, and an example case where the display device is mounted in a vehicle.

As shown in FIG. 2, the display device is built into the dashboard of the vehicle, and the display unit 100 is placed between a driver's seat DS and the passenger's seat AS. The display unit 100 has an operation unit 150 for allowing users to manually handle the display device.

The passenger in the driver's seat DS serves as the observer OBR, and the passenger in the passenger's seat AS serves as the observer OBL. Those passengers can look at the first image IM1 (hereinafter also referred to as the D-seat image) and the second image IM2 (hereinafter also referred to as the P-seat image) displayed on the display unit 100 from the driver's seat DS and the passenger's seat AS at the same time.

Figure 3:
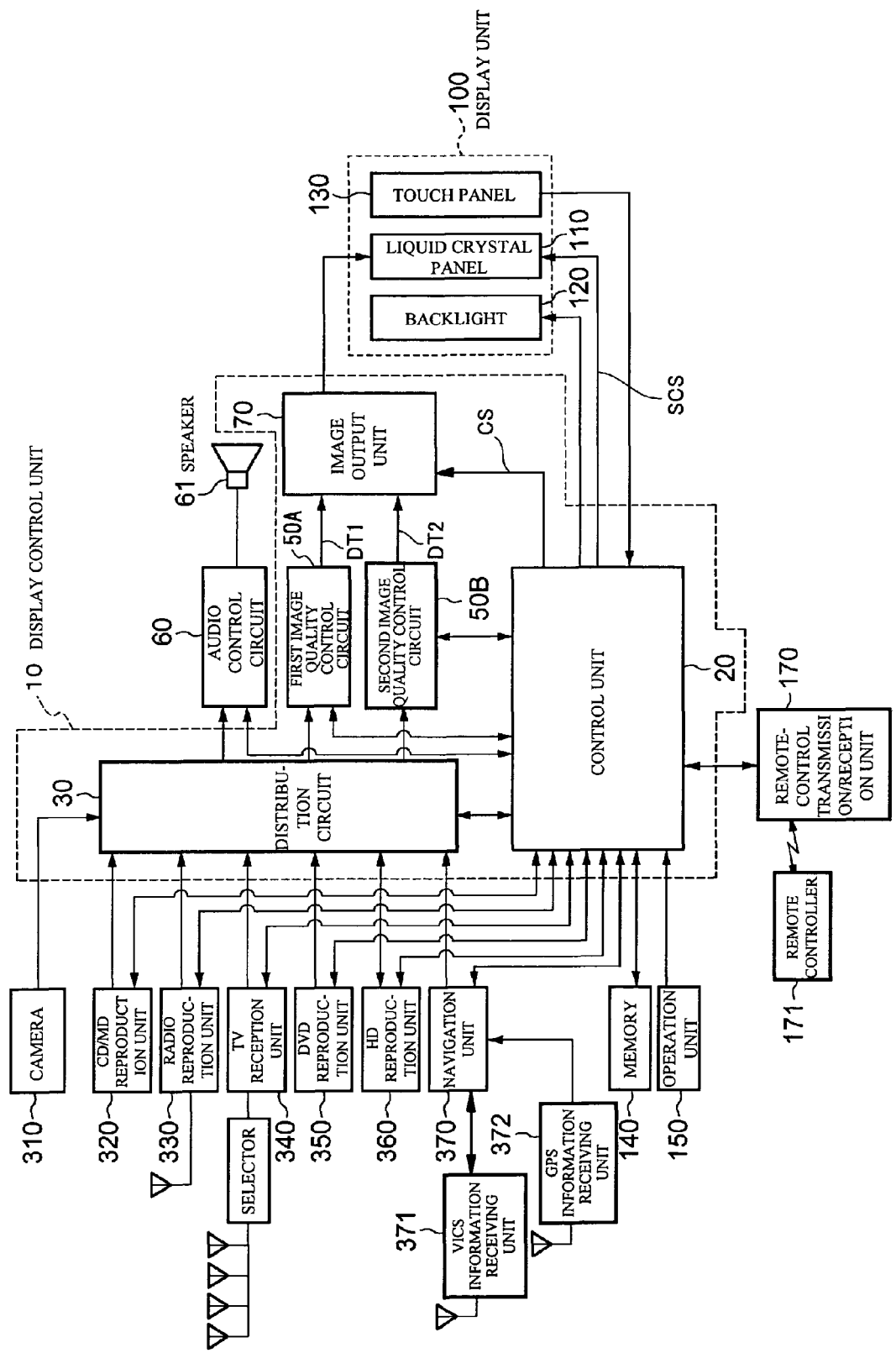
FIG. 3 is a functional block diagram of the structure of the display device.
Figure 4:
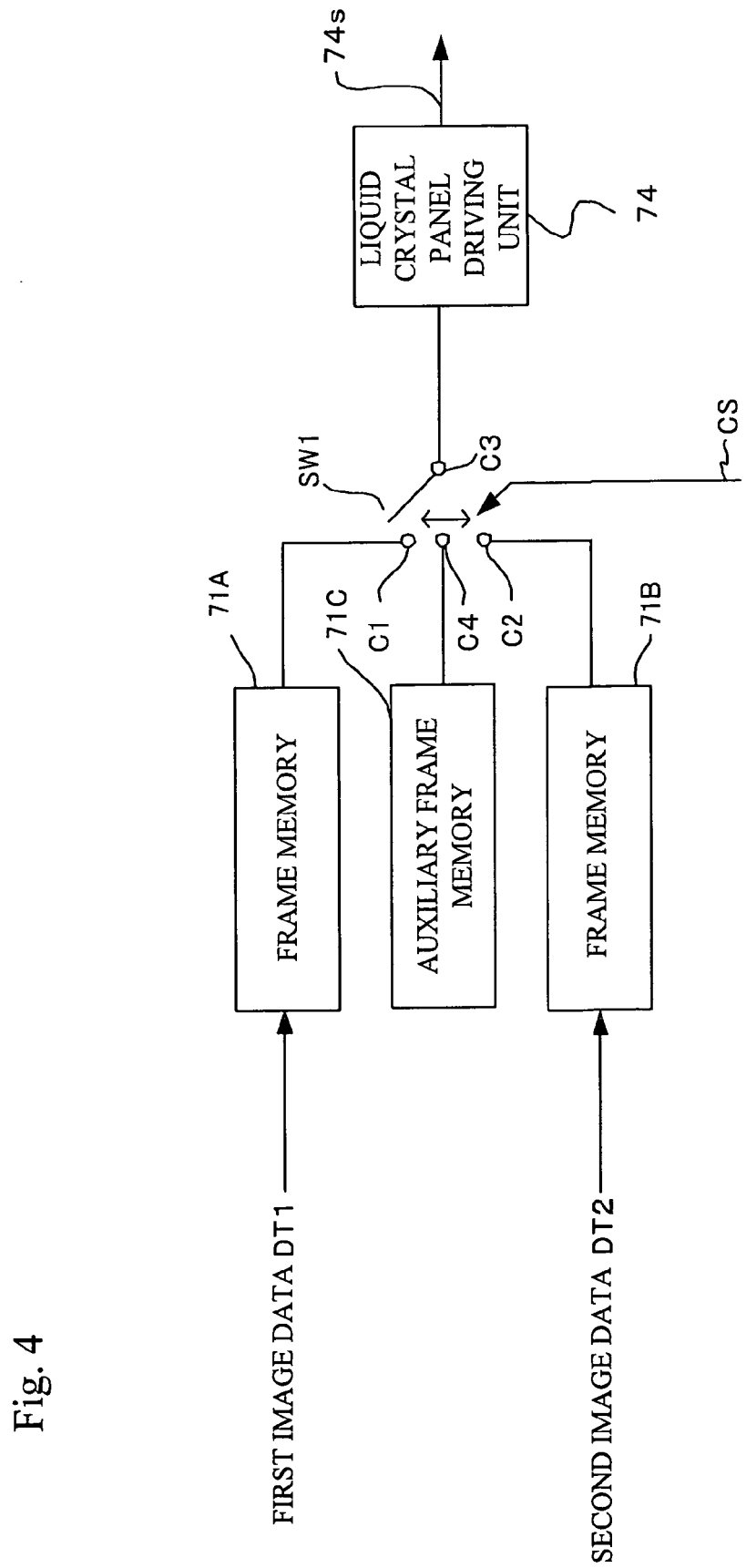
FIG. 4 is a functional block diagram of the structure of the image output unit.
Figure 5:
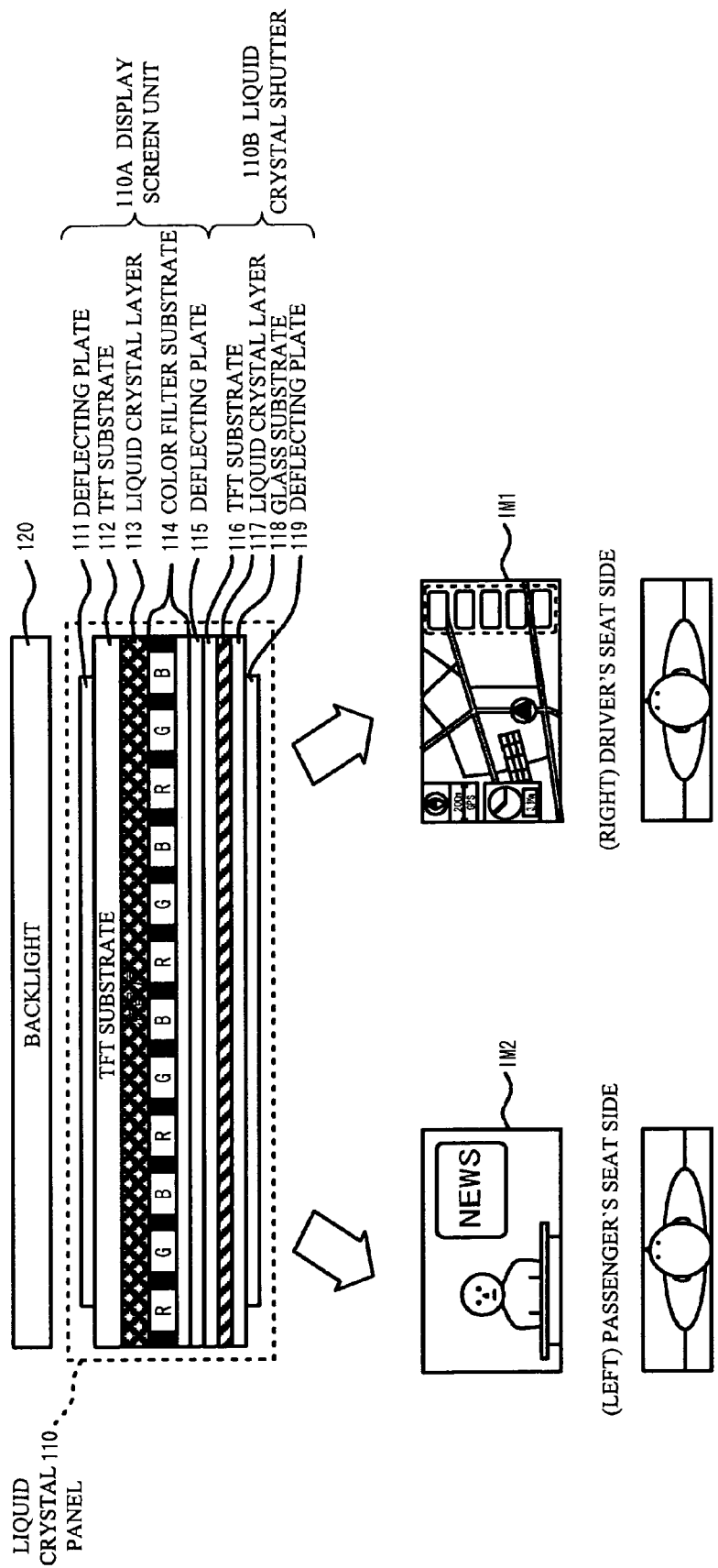
FIG. 5 is a cross-sectional view of the display unit, taken along a line extending in the horizontal direction.

FIGS. 3 through 5 illustrate the structure of the display device in accordance with an embodiment of the present invention. FIG. 3 is a functional block diagram of the entire structure of the display device. FIG. 4 is a functional block diagram of the structure of an image output unit. FIG. 5 is a cross-sectional view of the liquid crystal panel, taken along a line extending in a horizontal direction. FIGS. 6A and 6B illustrate the functions of the liquid crystal shutter.

As shown in FIG. 3, the display device includes a control unit 20, a distribution circuit 30, first and second image quality control circuits 50A and 50B, and an image output unit 70, as well as the display unit 100. The above described display control unit 10 is formed with the control unit 20, the distribution circuit 30, the first and second image quality control circuits 50A and 50B, and the image output unit 70.

The control unit 20 includes hardware formed with a processor (CPU), an interface, a ROM, and a RAM, and predetermined software. The control unit 20 controls the display device in a comprehensive manner. Specific control operations to be performed by the control unit 20 will be described later.

As shown in FIG. 3, the control unit 20 is connected to: a camera 30 that is mounted as an image and audio supply source in the vehicle, and captures images of the surroundings of the vehicle and the likes; a CD/MD (compact disk/mini disk) reproduction unit 320 that reproduces music and images; a radio reception unit 330 that receives radio airwaves from an antenna; a TV reception unit 340 that receives TV airwaves from the antenna via a selector; a DVD reproduction unit 350 that reproduces music information and images from DVDs (digital versatile disks); a HD reproduction unit 360 that reproduces images and music information recorded on a HD (hard disk); a navigation unit 370 that outputs a map or a route guide image based on road information received by a VICS information receiving unit 371 and geographical information received by a GPS information receiving unit 372; and the likes. The control unit 20 exchanges data with those connected components and also controls those components.

The control unit 20 is also connected to an external memory 140 for storing various kinds of data, the operation unit 150 for operating the display device, a remote-control transmission/reception unit 170 that exchanges infrared signals and radio signals with a remote controller 171 for remotely controlling the display device, and the likes. Based on various kinds of data obtained from those components, the control unit 20 can perform various kinds of control operations.

As shown in FIG. 3, the distribution circuit 30 distributes audio data and image data supplied from the camera 310, the CD/MD reproduction unit 320, the radio reception unit 330, the TV reception unit 340, the DVD reproduction unit 350, the HD reproduction unit 360, the navigation unit 370, and the likes, to an audio control circuit 60, the first image quality control circuit 50A, and the second image quality control circuit 50B, in accordance with a control instruction from the control unit 20.

The audio control circuit 60 adjusts audio data supplied from the distribution circuit 30, and outputs the audio data to a speaker 61, as shown in FIG. 3.

The first and second image quality adjustment circuits 50A and 50B each include a contract adjustment unit, a brightness adjustment unit, a tone adjustment unit, a gamma value adjustment unit, and the likes. In accordance with a control instruction from the control unit 20, the first and second image quality adjustment circuits 50A and 50B adjust the image quality (the contrast, brightness, tone, and gamma value) of the first and second image data (image signals) DT1 and DT2, and outputs the adjusted image data to the image output unit 70.

The memory 140 may be formed with an electrically rewritable nonvolatile memory such as a flash memory or a volatile memory backed up with batteries, for example. The memory 140 stores necessary data for control operations to be performed by the control unit 20, and the likes.

The image output unit 70 includes two frame memories 71A and 71B, an auxiliary frame memory 71C, a switch SW2, a liquid crystal panel driving unit 74, and the likes.

The first and second image data DT1 and DT2 having the image quality adjusted by the first and second image quality control circuits 50A and 50B are written in the frame memories 71A and 71B. The first and second image data DT1 and DT2 are image signals (video signals) from the TV reception unit 340, the DVD reproduction unit 350, the navigation unit 370, or the like. The first and second image data DT1 and DT2 are written into the frame memories 71A and 71B at an input rate of 1/60 seconds.

The auxiliary frame memory 71C holds the data of a buffer image to be inserted when switching is performed between the D-seat image IM1 and the P-seat image IM2. It is preferable that this buffer image is an achromatic image such as a black image. The auxiliary frame memory 71C holds the data of all the pixels of the liquid crystal panel 110.

The switch SW1 selectively connects a contact point C3 to contacts points C1, C4, and C2.

When the contact point C1 is connected to the contact point C3, the image data DT1 of one image (one frame) held in the frame memory 71A is output to the liquid crystal panel driving unit 74.

When the contact point C2 is connected to the contact point C3, the image data DT2 of one image (one frame) held n the frame memory 71B is output to the liquid crystal panel driving unit 74.

When the contact point C4 is connected to the contact point C3, the image data of the buffer image of one image (one frame) held in the auxiliary frame memory 71C is output to the liquid crystal panel driving unit 74.

When the contact point C1 is connected to the contact point C3, the liquid crystal panel driving unit 74 drives the pixels of the liquid crystal panel 110, based on the data DT1 held in the frame memory 71A. When the contact point C2 is connected to the contact point C3, the liquid crystal panel driving unit 74 outputs a drive signal for driving the pixels of the liquid crystal panel 110 to the liquid crystal panel 110, based on the data held in the frame memory 71B.

As shown in FIG. 3, the display unit 100 includes the liquid crystal panel 110, a backlight 120 that emits illumination light from the back-face side of the liquid crystal panel 110, a touch panel 130 for inputting a signal for operating the display device, and the likes. Although not shown, the touch panel 130 is in the form of a transparent sheet, and is bonded to the front face of the liquid crystal panel 110.

As shown in FIG. 5, the liquid crystal panel 110 includes the backlight 120, a display screen unit 110A that forms the display screen, and a liquid crystal shutter 110B that serves as a viewing-angle changing shutter.

The display screen unit 110A has a known structure, including a deflecting plate 111, a TFT (Thin Film Transistor) substrate 112, a liquid crystal layer 113, a color filter substrate 114 having RGB three-primary-color pixels, a deflecting plate 115, and the likes. Those components are arranged in this order, when seen from the side of the backlight 120. The liquid crystal panel 110 may have a display screen having 800 pixels arranged in the horizontal direction and 480 pixels arranged in the vertical direction.

The liquid crystal shutter 110B has a known structure, including a TFT (Thin Film Transistor) substrate 116, a liquid crystal layer 117, a glass substrate 118, a deflecting plate 119, and the likes. Those components are arranged in this order, when seen from the side of the display screen unit 110A.

The liquid crystal shutter 110B forms light transmitting portions and light shielding portions in the liquid crystal layer 117, in accordance with a control signal SCS from the control unit 20 shown in FIG. 3. By doing so, the liquid crystal shutter 110B changes the viewing angle on the display screen of the display screen unit 110A. The viewing angle represents a range (an angle) in which the contents displayed on the display screen can be viewed.

More specifically, when a D-seat image is displayed, the liquid crystal shutter 110B forms light transmitting portions and light shielding portions in the liquid crystal layer 117, so as to selectively shield the image light L1 traveling from each pixel PX to the P-seat side and selectively allow the image light L1 traveling from each pixel PX to the D-seat side to reach the D-seat side, as shown in FIG. 6A. When a P-seat image is displayed, the liquid crystal shutter 110B forms light transmitting portions and light shielding portions in the liquid crystal layer 117, so as to selectively shield the image light L2 traveling from each pixel PX to the D-seat side and selectively allow the image light L2 traveling from each pixel PX to the P-seat side to reach the P-seat side, as shown in FIG. 6B.

In this manner, the first image IM1 can be viewed from the right-hand side (the driver's seat side) of the liquid crystal panel 110, and the second image IM2 can be viewed from the left-hand side (the passenger's seat side), as shown in FIG. 5.

Referring now to FIGS. 7 through 9D, an example of a display control operation to be performed by the control unit 20 is described.

Figure 7:
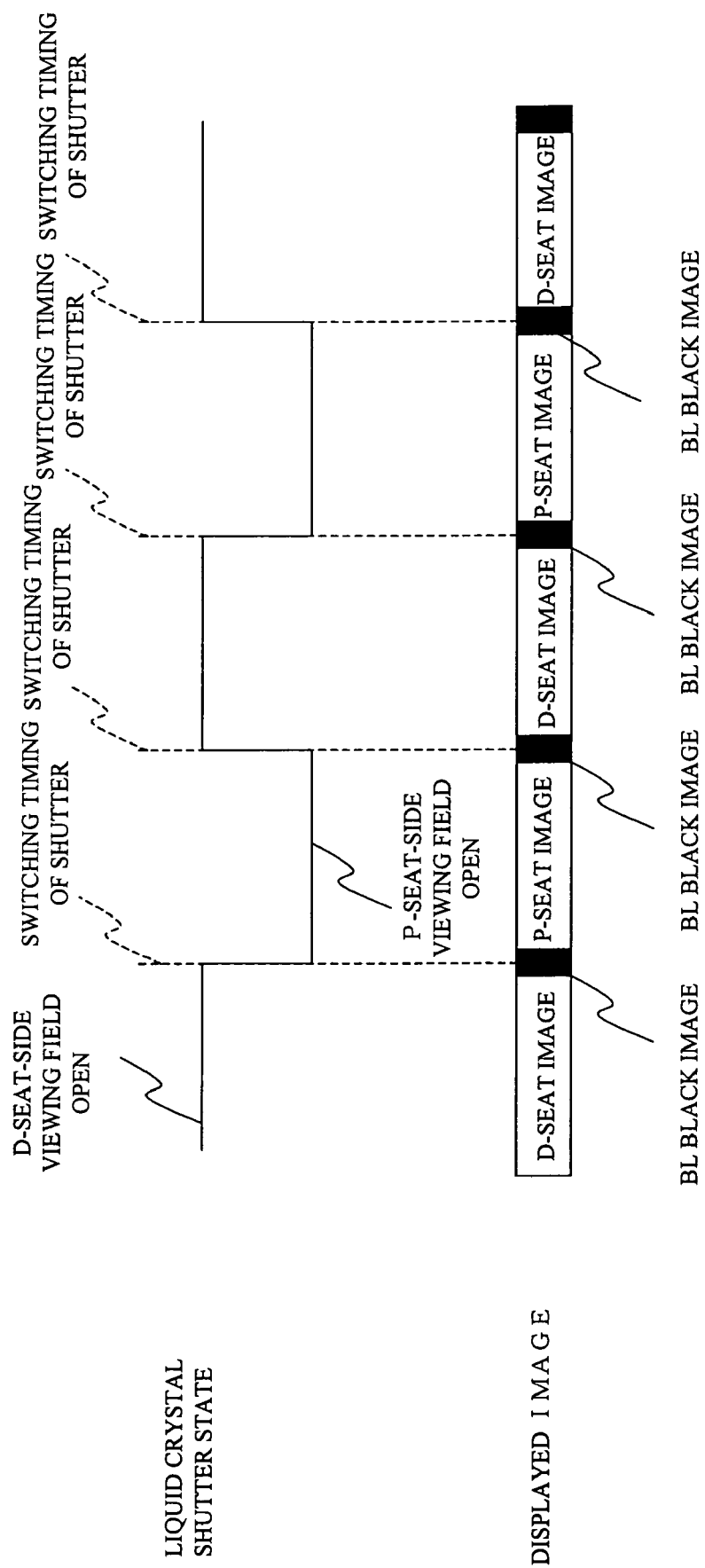
FIG. 7 illustrates a method of driving the liquid crystal shutter in conjunction with the switching between displayed images.
Figure 8:
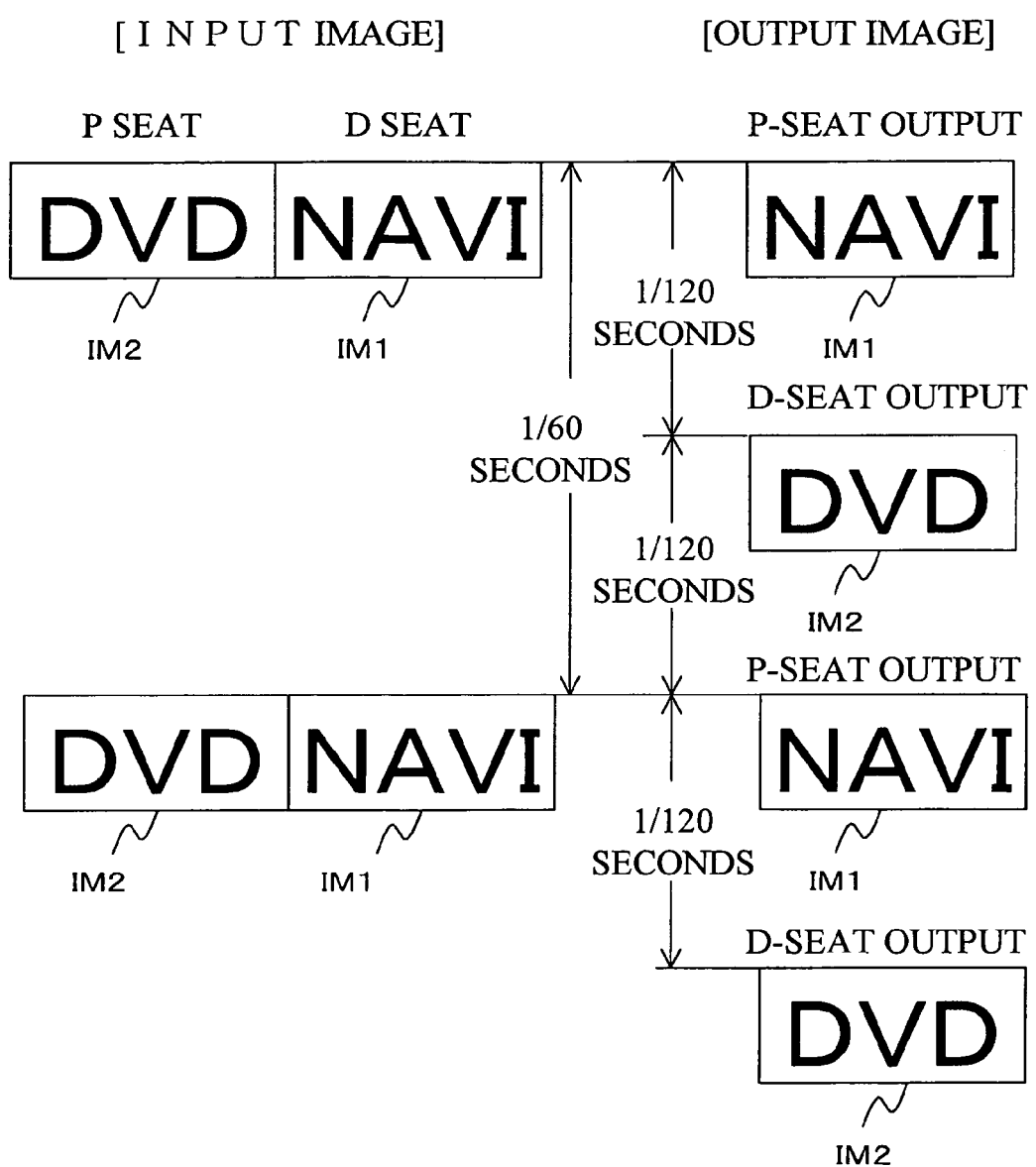
FIG. 8 shows the relationship between the input timings and the output timings as to images to be displayed on the display screen of the liquid crystal panel.

FIG. 7 illustrates a method of driving the liquid crystal shutter in conjunction with the switching of displayed images. FIG. 8 shows the relationship between the input timings and the output timings as to images to be displayed on the display screen of the liquid crystal panel. FIGS. 9A, 9B, 9C, and 9D show the relationships between the liquid crystal shutter and the respective display states.

The control unit 20 outputs a control signal CS to the image output unit 70, so as to alternately display a D-seat image and a P-seat image on the display screen of the liquid crystal panel 110 in a time-sharing manner, as shown in FIG. 7.

More specifically, as shown in FIG. 8, the image data of the D-seat image IM1 and the P-seat image IM2 are input to the image output unit 70 at an input rate of 1/60 seconds. The switching by the switch SW1 is performed in accordance with the control signal CS, and the D-seat image IM1 and the P-seat image IM2 are alternately output to the display screen of the liquid crystal panel 110 at an output rate of 1/120 seconds. The D-seat image IM1 and the P-seat image IM2 are displayed with the use of all the pixels of the display screen of the liquid crystal panel 110.

Further, the control unit 20 causes the D-seat image IM1 and the P-seat image IM2 in a time-sharing manner as shown in FIG. 7, and outputs the control signal SCS to the liquid crystal shutter 110B, so as to control the liquid crystal shutter 110B in conjunction with the switching between the D-seat image IM1 and the P-seat image IM2. By doing so, the control unit changes the viewing angle on the display screen.

Figure 9A:
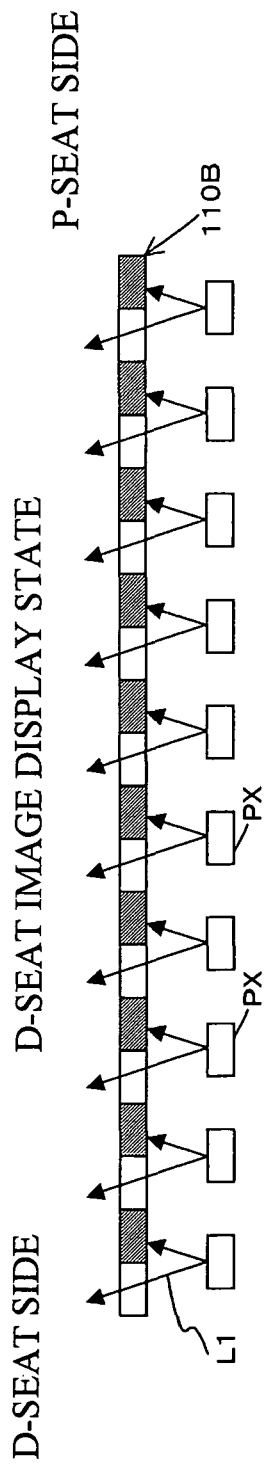
FIGS. 9A, 9B, 9C, and 9D show the relationships between the liquid crystal shutter and the respective display states.

More specifically, when the D-seat image IM1 is displayed, the control unit 20 performs a control operation, so that the field of view on the D-seat side is opened, and the image light L1 of the D-seat image IM1 passes through the liquid crystal shutter 110B, as shown in FIG. 9A. When the P-seat image IM2 is displayed, the control unit 20 performs a control operation, so that the field of view on the P-seat side is opened, and the image light L2 of the P-seat image IM2 passes through the liquid crystal shutter 110B, as shown in FIG. 9D.

The control unit 20 outputs the control signal CS to the image output unit 70, so as to control a switch SW2. By doing so, the D-seat image and the P-seat image are alternately displayed on the display screen of the liquid crystal panel 110 in a time-sharing manner, as shown in FIG. 7. The control unit 20 also inserts a black image BL as a buffer image every time the displayed image is switched between the D-seat image and the P-seat image, so as to form a non-display state for a predetermined period of time.

Further, the control unit 20 outputs the control signal SCS to the liquid crystal shutter 110B, so that the fields of view of the display screen of the liquid crystal panel 110 can be switched during the non-display state in which the black image BL is displayed.

More specifically, the control unit 20 performs a control operation, so that the D-seat image IM1 is displayed, and the field of view on the D-seat side is opened to allow the image light L1 of the D-seat image IM1 travel to the D-seat side through the liquid crystal shutter 110B, as shown in FIG. 9A.

Figure 9B:
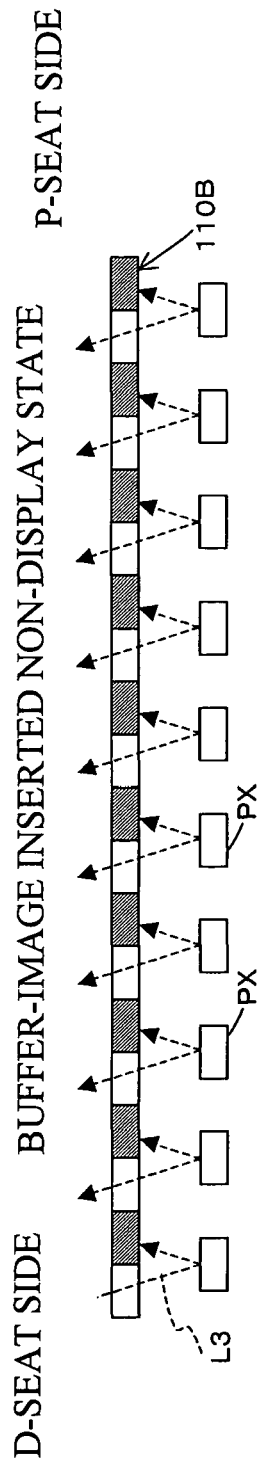

Before switching the displayed image from the D-seat image IM1 to the P-seat image IM2, the control unit 20 inserts the black image BL, as shown in FIG. 9B. At this point, the image light L3 of the black image BL travels to the field of view of the D-seat side through the liquid crystal shutter 110B. Accordingly, the liquid crystal panel 110 is put into a non-display state.

Figure 9C:
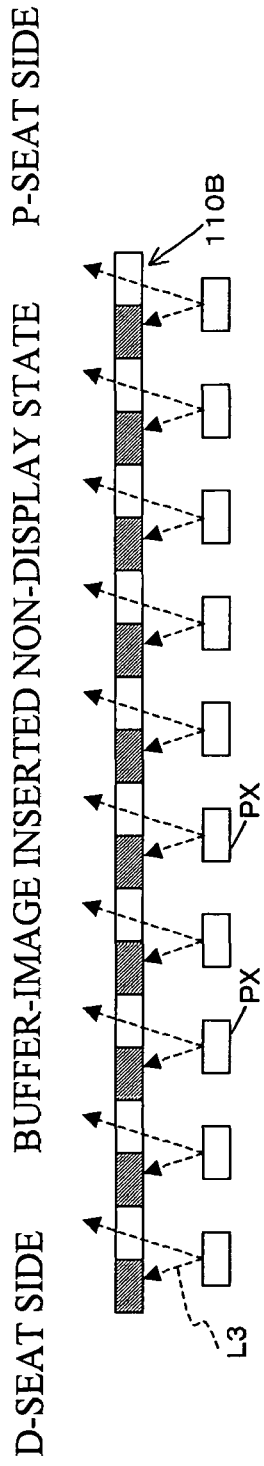
Figure 9D:
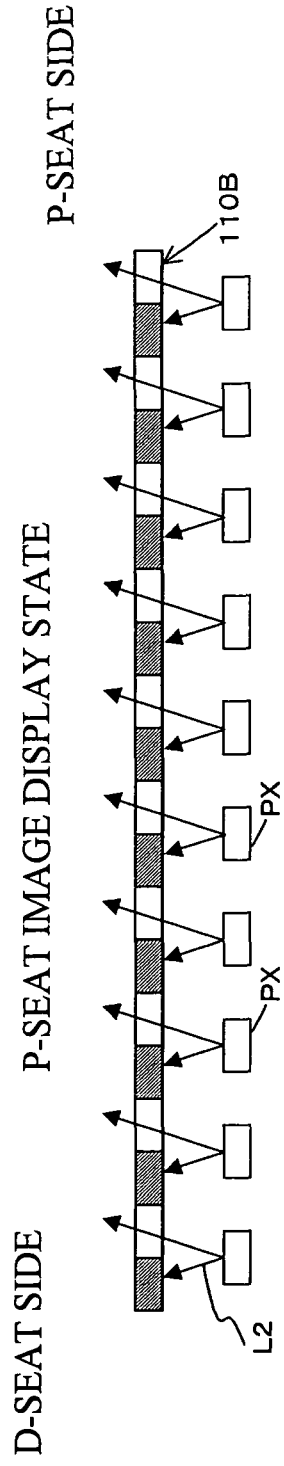

While maintaining the black-image BL displayed state, the control unit 20 controls the liquid crystal shutter 110B so as to open the field of view on the P-seat side, as shown in FIG. 9C. By doing so, the image light L3 of the black image BL is output toward the field of view on the P-seat side, and the non-display state of the liquid crystal panel 110 is maintained.

The control unit 20 then displays the p-seat image IM2 in place of the black image BL, as shown in FIG. 9D. By doing so, the image light L2 of the p-seat image IM2 travels to the P-seat side through the liquid crystal shutter 110B.

As described above, in this embodiment, the black image BL is inserted as a buffer image when the displayed image is switched between the D-seat image IM1 and the P-seat image IM2, and the field of view of the liquid crystal shutter 110B is switched while the black image BL is displayed. With this arrangement, even if there are some differences in the switching timing in the liquid shutter 110B, it is possible to prevent an image of the D-seat image IM1 from leaking into the field of view on the P-seat side, and prevent an image of the P-seat image IM2 from leaking into the field of view on the D-seat side. It is also possible to prevent the flicker in images due to rapid changes in images.

The period of display of the black image BL can be arbitrarily set in accordance with variations of responses from the liquid crystal shutter 110B and the likes.

Referring now to FIGS. 10 through 12B, another example of a display control operation to be performed by the control unit 20 is described.

Figure 10:
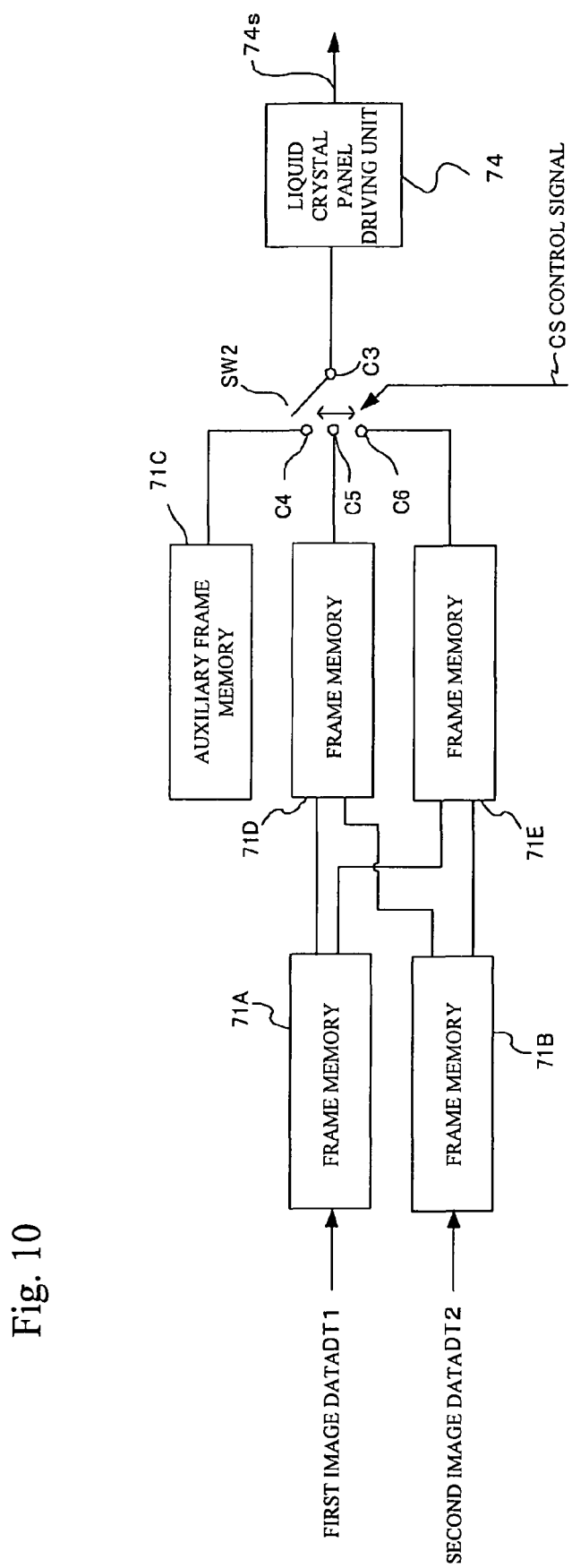
FIG. 10 illustrates another example structure of the image output unit.

FIG. 10 illustrates another example structure of the image output unit. FIGS. 11A, 11B, 11C, and 11D illustrate the display states observed where output patterns including the D-seat image IM1 and the P-seat image IM2 are formed on the same screen.

As shown in FIG. 10, the image output unit 70 includes: frame memories 71A and 71B that store the first and second image data DT1 and DT2; a frame memory 71D that stores composite image data formed by combining the image data of the pixel at a predetermined position M in the image stored in the frame memory 71A and the image data of the pixel at a predetermined position N (an exclusive position with respect to the predetermined position M) in the image stored in the frame memory 71B; a frame memory 71E that stores composite image data formed by combining the image data of the pixel at the predetermined position N in the image stored in the frame memory 71A and the image data of the pixel at the predetermined position M in the image stored in the frame memory 71B; a contact point C5 connected to the frame memory 71D; a contact point C6 connected to the frame memory 71E; an auxiliary frame memory 71C; a switch SW2; a liquid crystal panel driving unit 74; and the likes. In FIG. 10, the same components as those of the image output unit shown in FIG. 4 are denoted by the same reference numerals as those used in FIG. 4.

Among the image data stored in the frame memory 71A, the data of pixels in a pixel group m1 of every other pixel in the longitudinal and transverse directions (or pixels in a hound's-tooth arrangement) is stored in the memory positions corresponding to the respective pixel positions in the frame memory 71D. Among the image data stored in the frame memory 71A, the data of pixels in a pixel group m2 of pixels exclusive of the pixels in the pixel group m1 is stored in the memory positions corresponding to the respective pixel positions in the frame memory 71E. Among the image data stored in the frame memory 71B, the data of pixels in a pixel group n2 of pixels exclusive of the pixels in the pixel group m1 is stored in the memory positions corresponding to the respective pixel positions in the frame memory 71D. Among the image data stored in the frame memory 71B, the data of pixels in a pixel group n1 of pixels exclusive of the pixels in the pixel group n2 is stored in the memory positions corresponding to the respective pixel positions in the frame memory 71E. Accordingly, image data is stored in the frame memory 71D in such a manner that the pixel groups m1 and n2 are alternately arranged in the longitudinal and transverse directions, and image data is stored in the frame memory 71E in such a manner that the pixel groups n1 and m2 are alternately arranged in the longitudinal and transverse directions.

The switch SW2 selectively connects the contact point C3 to the contact points C4, C5, and C6, in accordance with the control signal CS from the control unit 20.

When the contact point C5 is connected to the contact point C3, the image data of one image (one frame) stored in the frame memory 71D (or the composite data of the pixel groups m1 and n2) is output to the liquid crystal panel driving unit 74.

When the contact point C6 is connected to the contact point C3, the image data of one image (one frame) stored in the frame memory 71E (or the composite data of the pixel groups n1 and m2) is output to the liquid crystal panel driving unit 74. With this arrangement, the image output unit 70 has the D-seat image IM1 displayed on a group of pixels on the display screen of the liquid crystal panel 110, and has the P-seat image IM2 on the other group of pixels. This will be described in greater detail.

The control unit 20 switches output patterns including the D-seat image IM1 and the P-seat image IM2, and outputs the output patterns onto the same screen in a time-sharing manner. The control unit 20 also outputs the control signal SCS to the liquid crystal shutter 110B, so as to control the liquid crystal shutter 110B in conjunction with the switching of output patterns. In this manner, the viewing angle on the display screen is changed.

In the display state shown in FIG. 11A, an image signal D of the D-seat image IM1 and an image signal P of the P-seat image IM2 are alternately output to the respective pixel rows (PX) on the display screen (an alternate output pattern). More specifically, when the contact point C3 is connected to the contact points C5 and C6, the image output unit 70 generates the composite images shown in FIGS. 11A and 11D, based on the first image data DT1 and the second image data DT2, respectively. The composite image shown in FIG. 11A is formed by combining a first designated pixel group in the D-seat image IM1 and a second designated pixel group existing in the positions exclusive of the pixels in the first designated pixel group in the P-seat image IM2. The composite image shown in FIG. 11D is formed by combining a second designated composite pixel group existing in the same positions as the first designated pixel group in the P-seat image IM2 and a first exclusive pixel group existing in the positions exclusive of the pixels in the second designated pixel group in the D-seat image IM1.

Meanwhile, driving of the liquid crystal shutter 110B is controlled to have such a light shielding pattern as to create separate displays on the D-seat side and the P-seat side in accordance with the alternate output pattern, or to have such a light shielding pattern that the image signal of the D-seat image IM1 is not displayed on the right-hand side (the passenger's seat) but can be seen from the left-hand side (the driver's seat), while the image signal P of the P-seat image IM2 is not displayed on the left-hand side (the driver's seat) but can be seen from the right-hand side (the passenger's seat).

Before switching output patterns, the control unit 20 connects the contact point C3 to the contact point C4, and inserts the black image BL to all the pixels PX, as shown in FIG. 11B. At this point, the image light L3 of the black image BL from each pixel on which the image signal D of the D-seat image IM1 was displayed earlier travels to the field of view on the D-seat side through the liquid crystal shutter 110B. The image light L4 of the black image BL from each pixel on which the image signal P of the P-seat image IM2 was displayed earlier travels to the filed of view on the P-seat side through the liquid crystal shutter 110B. In this manner, the liquid crystal panel 110 is put into a non-display state.

The control unit 20 maintains the connected state between the contact point C3 and the contact point C4, and the black-image BL displayed state. The image light L3 and L4 of the black image BL is then shut off by the liquid crystal shutter 110B, and the image light L5 of the black image BL from each pixel on which the image signal D of the D-seat image IM1 was displayed earlier travels to the field of view on the P-seat side through the liquid crystal shutter 110B, as shown in FIG. 11C. Also, the image light L6 of the black image BL from each pixel on which the image signal P of the P-seat image IM2 was displayed earlier travels to the filed of view on the D-seat side through the liquid crystal shutter 110B. In this manner, the non-display state of the liquid crystal panel 110 is maintained.

The control unit 20 then performs a drive control operation to achieve the following results. As shown in FIG. 11D, the image signal P of the P-seat image IM2 is output to each pixel on which the image signal D of the D-seat image IM1 was displayed earlier. The image signal D of the D-seat image IM1 is output to each pixel on which the image signal P of the P-seat image IM2 was displayed earlier. The liquid crystal shutter 110B is controlled to have such a light shielding pattern as to create separate displays on the D-seat side and the P-seat side in synchronization with the switching of the display contents held in each pixel row, or to have such a light shielding pattern that the image signal D of the D-seat image IM1 is not displayed on the right-hand side (the passenger's seat) but can be seen from the left-hand side (the driver's seat), while the image signal P of the P-seat image IM2 is not displayed on the left-hand side (the driver's seat) but can be seen from the right-hand side (the passenger's seat).

The transition from the display state shown in FIG. 11A to the display state shown in FIG. 11D is repeated (it is preferable to increase the number of output frames per unit time to a number that is twice as many as or larger than the number of output frames per unit in a conventional case, for example). By doing so, the image in the display state shown in FIG. 11A and the image in the display state shown in FIG. 11D are alternately displayed in a time-sharing manner. By virtue of an afterimage effect, it is possible to allow the driver to view the contents of each display output for the driver, and allow the non-driver (the passenger) to view the contents of each display output for the non-driver, without a decrease in resolution (or a decrease in the number of valid pixels).

Also, since the black image BL is inserted while the display state shown in FIG. 11A is switched to the display state shown in FIG. 11D, the image on one side can be prevented from leaking into the image on the other side due to a control time lag between the switching of images and the switching of the liquid crystal shutter.

Figure 12A:
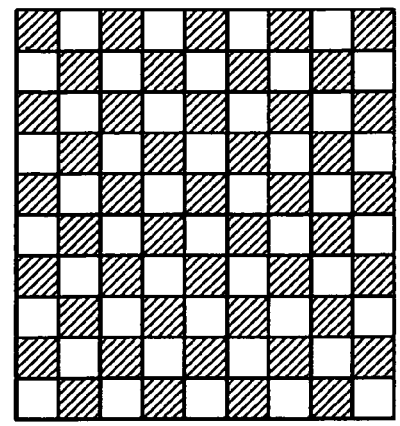
FIGS. 12A and 12B illustrate the light shielding patterns of the liquid crystal shutter.
Figure 12B:
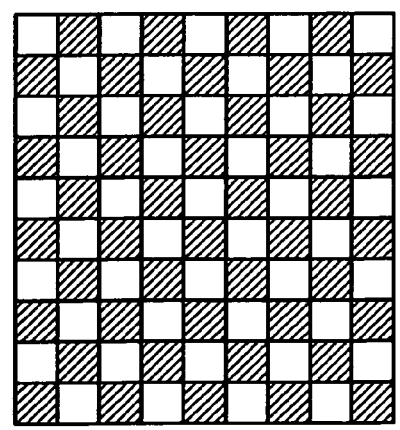

FIGS. 12A and 12B illustrate the light shielding patterns of the liquid crystal shutter, and schematically and partially show the display states observed when the liquid crystal panel 110 equipped with the liquid crystal shutter 110B is seen from the front side.

FIG. 12 shows a case where a drive control operation is performed so that the pixels forming the liquid crystal shutter 110B have lattice-like (hound's-tooth) light shielding patterns. The lattice-like output patterns including the image signal D of the D-seat image IM1 and the image signal P of the P-seat image IM2 are switched and output to the display unit 100 in a time-sharing manner. The timing for switching the lattice-like output patterns is synchronized with the timing for switching the lattice-like light shielding patterns of the liquid crystal shutter 110B. Each of the pixels forming the liquid crystal shutter 110B is placed out of alignment with each pixel of the liquid crystal panel 110, as shown in the drawings. One of the pixels of the liquid crystal shutter 110B shuts off either the image signal D of the D-seat image IM1 or the image signal P of the P-seat image IM2, so that only the image signal D can be viewed from the driver's seat, and only the image signal P can be viewed from the passenger's seat.

The transition between the first display state shown in FIG. 12A and the second display state shown in FIG. 12B is repeated (it is preferable to increase the number of output frames per unit time to a number that is twice as many as or larger than the number of output frames per unit in a conventional case, for example). By doing so, the images in those display states are superimposed timewise on each other, and a decrease in resolution can be prevented by virtue of the afterimage effect.

In the above embodiment, the number of pixels (the pixel size) of the liquid crystal panel 110 and the number of pixels (the pixel size) of the liquid crystal shutter 110B are set at the ratio of 1 to 1. However, it is possible to use a structure in which the ratio of the number of pixels (the pixel size) of the liquid crystal shutter 110B with respect to the number of pixels (the pixel size) of the liquid crystal panel 110 is increased (2 to 1 or higher, for example). In such a structure, various light shield patterns can be controlled, and the viewing angle and the likes can be adjusted with high precision.

Although the black image is used as the buffer image in the above embodiment, it is also possible to use a one-colored image such as an image in gray, or to use a one-colored image in a chromatic color.

In the above embodiment, the D-seat image IM1 and the P-seat image IM2 are displayed in an even time-sharing manner. However, it is also possible to arbitrarily change the ratio between the display periods in accordance with the information amounts of the images, for example.

In the above embodiment, switching is performed between two images (display contents), and the viewing angle is switched between two directions. However, it is also possible to display three or more images in a time-sharing manner, and output the images at three or more different viewing angles.

In the above embodiment, the present invention is applied to a display device for vehicles. However, the present invention may also be applied to display devices not designed for vehicles.

In the above embodiment, the viewing angle (the display mode) is controlled so that the fields of view of the different observers OBR and OBL can be covered. However, it is also possible to apply the present invention to a display device such as a three-dimensional image display device that has a variable shutter placed in front of the display unit and switches between different display modes designed for the right eye and the left eye of the same observer (or switches the viewing angle between the direction for the right eye and the direction for the left eye of the same observer).

The above embodiments are preferred embodiments of the present invention. However, the present invention is not limited to those specific examples, and various changes and modification may be made to them, without departing from the scope of the invention.

The invention claimed is:

1. A display device comprising:
a shutter that is provided on a display screen, shields part of the display screen, and is capable of changing the shielded region; and
a display control unit that displays a plurality of display contents on the display screen in a time-sharing manner, and changes image display modes by controlling the shutter in synchronization with the switching between the display contents,
the display control unit inserting a buffer image when switching the image display modes,
the display control unit generates a first composite image by combining a first designated pixel group in a first image and a second exclusive pixel group existing in a position exclusive of the first designated pixel group in a second image, generates a second composite image by combining a second designated pixel group existing in the same position as the first designated pixel group in the second image and a first exclusive pixel group existing in a position exclusive of the second designated pixel group in the first image, and displays the first and second composite images on the display screen in a time-sharing manner,
the first designated pixel group and the second exclusive pixel group are alternately arranged in the longitudinal and transverse directions in the first image,
the second designated pixel group and the first exclusive pixel group are alternately arranged in the longitudinal and transverse directions in the second image, and
the shutter has a pixel group arranged in the hound's-tooth form which is placed out of alignment with each pixel of the display screen.

2. A display device comprising:
a viewing-angle changing shutter that is provided on a display screen, and is capable of changing a viewing angle of the display screen; and
a display control unit that displays a plurality of display contents on the display screen in a time-sharing manner, and controls the viewing-angle changing shutter in synchronization with the switching between the display contents so as to create displays at different viewing angles,
the display control unit inserting a buffer image when switching the image display modes,
the display control unit generates a first composite image by combining a first designated pixel group in a first image and a second exclusive pixel group existing in a position exclusive of the first designated pixel group in a second image, generates a second composite image by combining a second designated pixel group existing in the same position as the first designated pixel group in the second image and a first exclusive pixel group existing in a position exclusive of the second designated pixel group in the first image, and displays the first and second composite images on the display screen in a time-sharing manner,
the first designated pixel group and the second exclusive pixel group are alternately arranged in the longitudinal and transverse directions in the first image,
the second designated pixel group and the first exclusive pixel group are alternately arranged in the longitudinal and transverse directions in the second image, and
the shutter has a pixel group arranged in the hound's-tooth form which is placed out of alignment with each pixel of the display screen.

3. A display method of switching image display modes by controlling a display image displayed on a display screen and a shuttered state of a partial region on the display screen in synchronization with each other,
the method comprising the step of
displaying a buffer image when switching the display modes,
generating a first composite image by combining a first designated pixel group in a first image and a second exclusive pixel group existing in a position exclusive of the first designated pixel group in a second image;
generating a second composite image by combining a second designated pixel group existing in the same position as the first designated pixel group in the second image and a first exclusive pixel group existing in a position exclusive of the second designated pixel group in the first image; and
displaying the first and second composite images on the display screen in a time-sharing manner, the first designated pixel group and the second exclusive pixel group are alternately arranged in the longitudinal and transverse directions in the first image, the second designated pixel group and the first exclusive pixel group are alternately arranged in the longitudinal and transverse directions in the second image, and the shutter has a pixel group arranged in the hound's-tooth form which is placed out of alignment with each pixel of the display screen.

4. A display method of displaying images at different viewing angles by displaying a plurality of display contents on a display screen in a time-sharing manner, and controlling a viewing angle changing shutter provided on the display screen in synchronization with the switching between the display contents, the method comprising the step of displaying a buffer image when switching the display modes generating a first composite image by combining a first designated pixel group in a first image and a second exclusive pixel group existing in a position exclusive of the first designated pixel group in a second image;

generating a second composite image by combining a second designated pixel group existing in the same position as the first designated pixel group in the second image and a first exclusive pixel group existing in a position exclusive of the second designated pixel group in the first image; and displaying the first and second composite images on the display screen in a time-sharing manner, the first designated pixel group and the second exclusive pixel group are alternately arranged in the longitudinal and transverse directions in the first image, the second designated pixel group and the first exclusive pixel group are alternately arranged in the longitudinal and transverse directions in the second image, and the shutter has a pixel group arranged in the hound's-tooth form which is placed out of alignment with each pixel of the display screen.

* * * * *